United States Patent [19]
McCauley

[11] Patent Number: 6,119,069
[45] Date of Patent: Sep. 12, 2000

[54] SYSTEM AND METHOD FOR DERIVING FIELD BOUNDARIES USING ALPHA SHAPES

[75] Inventor: James Darrell McCauley, Clarendon Hills, Ill.

[73] Assignee: Case Corporation, Racine, Wis.

[21] Appl. No.: 09/258,962

[22] Filed: Mar. 1, 1999

[51] Int. Cl.$^7$ .................................................. G06F 19/00
[52] U.S. Cl. ............................................................. 702/5
[58] Field of Search .................................. 701/50; 702/5; 56/10.2 R, 10.2 A, 10.2 D, 10.2 F

[56] References Cited

U.S. PATENT DOCUMENTS

| | | | |
|---|---|---|---|
| 4,814,711 | 3/1989 | Olsen et al. | 324/331 |
| 4,815,012 | 3/1989 | Feintuch | 364/521 |
| 5,214,757 | 5/1993 | Mauney et al. | 395/161 |
| 5,265,024 | 11/1993 | Crabill et al. | 364/443 |
| 5,323,317 | 6/1994 | Hampton et al. | 364/420 |
| 5,334,987 | 8/1994 | Teach | 342/357 |
| 5,418,906 | 5/1995 | Berger et al. | 395/161 |
| 5,467,271 | 11/1995 | Abel et al. | 364/420 |
| 5,471,392 | 11/1995 | Yamashita | 364/443 |
| 5,528,518 | 6/1996 | Bradshaw et al. | 364/561 |
| 5,544,052 | 8/1996 | Fujita et al. | 364/420 |
| 5,561,747 | 10/1996 | Crocker et al. | 395/119 |
| 5,771,169 | 6/1998 | Wendte | 364/420 |

OTHER PUBLICATIONS

Edelsbrunner, Herbert, "Weighted Alpha Shapes", Technical Report UIUCDCS–R–92–1760, Dept. of Comp. Sci., Univ. of Ill. at Urbana–Champaign, Urbana, Ill. (1992), p. 1–15.

Edelsbrunner, Herbert et al., "On the Shape of a Set of Points in the Plane", IEEE Transactions on Information Theory, vol. IT–29, No. 4, Jul. 1983, pp. 551–559.

Edelsbrunner, Herbert and Mücke, Ernst P., "Three–dimensional Alpha Shapes", ACM Transactions on Graphics, 13(1):43–72, 1994, pp. 1–31.

de Berg, Mark, et al., "Computational Geometry: Algorithms and Applications", printed Dec. 2, 1998 from http://www.cs.uu.nl/geobook/overview.html, pp. 1–2 (book review).

Akkiraju, Nataraj et al., "Alpha Shapes: Definition and Software", printed Dec. 2, 1998 from http://www.geom.umn.edu/software/cglist/GeomDir/shapes95def/node3.html, node7.html and node2.html.

Terrano, Anthony E. et al., "Using an architectural knowledge base to generate code for parallel computers", Communications of the ACM, Sep. 1989, vol. 32, No. 9, p. 1065.

Petzold, Charles, "GDI comes of age: exploring the 32–bit graphics of Windows NT; Graphics Device Interface; programming techniques; Technical", Microsoft Systems Journal, Sep. 1992, vol. 7, No. 5, p. 41.

Lukatela, Hrvoje et al., "Spatial data and the Voronoi tessellation: unrestricted modeling and efficient manipulation of terrestrial objects", Dr. Dobb's Journal of Software Tools, Dec. 1992, vol. 17, No. 12, p. 18.

Gibbs, Betty L., Technical Articles, Mineral Industry Software, Mining Annual Review, Jul., 1993, p. 57.

(List continued on next page.)

*Primary Examiner*—Donald E. McElheny, Jr.
*Attorney, Agent, or Firm*—Foley & Lardner

[57] ABSTRACT

A system and method for determining the boundaries of a field is disclosed. The system and method utilizes computational geometry and, in particular, the alpha shape of the field to derive the field boundary of a set of georeferenced data points. The method includes collecting georeferenced data for the field, assigning the georeferenced data to a data set, filtering the data to remove anomalous data points, filtering the data to remove known inside points, scaling the point coordinates from decimal to integer form, determining the alpha shape of the set, buffering the alpha shape to compensate for antenna position, and outputting the field boundary.

38 Claims, 8 Drawing Sheets

OTHER PUBLICATIONS

Hall, Valerie, "Morphing in 2–D and 3–D; includes related articles on morphing in films, on Rmorf shareware morphing software and on two–pass mesh warping algorithm", Dr. Dobb's Journal of Software Tools, Jul. 1993, vol. 18, No. 7, p. 18.

Mehlhorn, Kurt et al., "LEDA: a platform for combinatorial and geometric computing; Library of Efficient Data Types and Algorithms", Communications of the ACM, Jan. 1995, vol. 38, No. 1, p. 96.

Cressie, Noel A. C., "Statistics for Spatial Data", The Many Faces of Spatial Prediction, pp. 372–375.

FIG. 3
| DATA POINT NO. | BU /ACRE | MOISTURE | LONGITUDE | LATITUDE | ... |
|---|---|---|---|---|---|
| 1 | 32.0739 | 17.7 | -88.7291520 | 39.0710720 | |
| 2 | 56.5808 | 18.1 | -88.7291140 | 39.0710720 | |
| 3 | 64.1104 | 17.1 | -88.7290720 | 39.0710740 | |
| 4 | 96.1741 | 16.4 | -88.7290320 | 39.0710760 | |
| 5 | 105.247 | 15.9 | -88.7289890 | 39.0710740 | |
| . | . | . | . | . | |
| . | . | . | . | . | |
| . | . | . | . | . | |
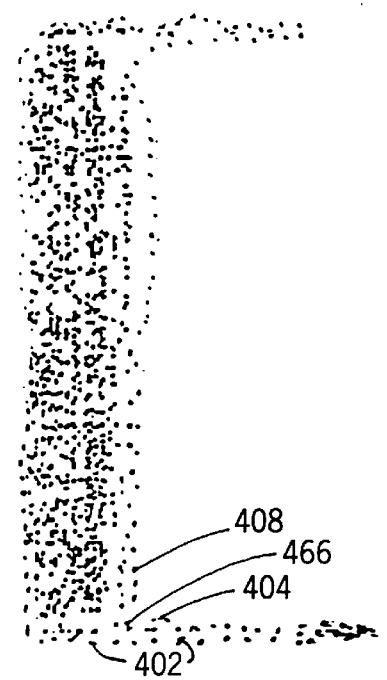
300
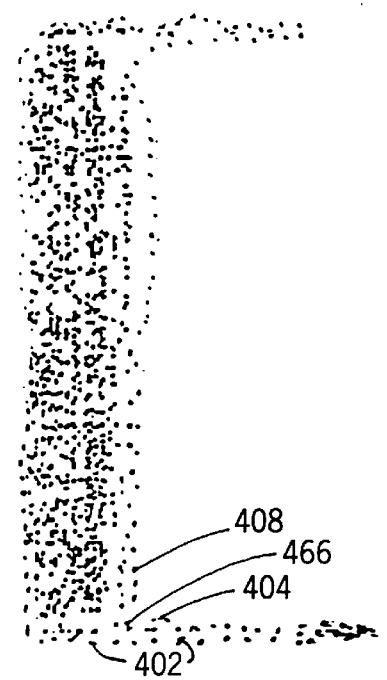
400
408
466
404
402
FIG. 4

SYSTEM AND METHOD FOR DERIVING FIELD BOUNDARIES USING ALPHA SHAPES

FIELD OF THE INVENTION

The present invention relates generally to a system and method for determining the boundary of a field. The present invention relates more specifically to a system and method for deriving the boundary of a field using computational geometry. More specifically yet, the present invention relates to a system and method for deriving the boundary of a field by generating an alpha shape of a set of georeferenced data.

BACKGROUND OF THE INVENTION

Research within the agricultural community has shown that management of crop production may be optimized by taking into account spatial variations that often exist within a given farming field. For example, by varying the farming inputs applied to a field according to local conditions within the field, a farmer can optimize crop yield as a function of the inputs being applied while preventing or minimizing environmental damage. This management technique has become known as precision, site-specific, prescription or spatially-variable farming and is becoming increasingly popular among the agricultural community.

The management of a field using precision farming techniques requires the gathering and processing of georeferenced data relating to site-specific characteristics of the field (i.e., georeferenced characteristic data). Georeferenced data refers to data having position information relative to the earth ( e.g., latitude and longitude information) or position information relative to an object on or in the earth (e.g., an antenna or other nearby object). The georeferenced characteristic data may be obtained by, for example, manual measuring or sensing during field operations. A farmer may take manual measurements by visually noting characteristics of a field (e.g., insect infestation) and recording the position as he traverses the field, or by taking soil samples and analyzing them in a laboratory. Sensing during field operations involves using appropriate sensors supported by a combine, tractor or other vehicle.

Georeferenced characteristic data may relate to the local conditions of the field, farming inputs applied to the field, or crops harvested from the field. For example, the gathered data may represent soil properties (e.g., soil type, soil fertility, soil moisture content, soil compaction or pH), crop properties (e.g., height, crop moisture content or yield), or farming inputs applied to the field (e.g., fertilizers, herbicides, water, insecticides, seeds, cultural practices or tillage techniques used). Other site-specific data may represent insect or weed infestation, landmarks, or topography (e.g., altitude). This data may then be stored in a Geographic Information System ("GIS", e.g., ARC/INFO, MapInfo, Agri-Logic Instant Yield Map or Spatial Database Engine by ESRI) for further processing either on the vehicle or at a remote computer.

The analysis of georeferenced characteristic data is a complex task requiring a knowledge base of the relationships between sensed field characteristics and the related needs of the field. A precursor to this analysis is a derivation of the boundary around the georeferenced characteristic data, i.e., the field boundary, The field boundary is required for the farmer to, inter alia, map out one or more of the fields in the farm, allow calculations of total field area and average yield or farming inputs applied, and allow prescription maps to be generated.

Several methods have been implemented for determining the field boundary. In one example, the farmer graphically views a set of location points from harvest data and "connects the dots" via a suitable graphical user interface to determine the field boundary. However, for data set including on the order of 50,000 points or more, this method is time-consuming and requires expensive graphical user interface equipment. Another proposed solution is to traverse the boundary of the field in a vehicle before farming and utilize a global positioning system (GPS) receiver to record location information for the field boundary. After traversing the boundary of the field, consecutive location points are connected to determine the field boundary. This solution, however, carries with it significant expenditures in time and resources that could be spent working the field. In the event an error occurs at some point in the boundary traversal (e.g., due to loss of satellite lock, loss of differential signal in a differential GPS system, or other error), these expenditures could be even more significant.

Accordingly, what is needed is a reliable system and method for deriving the field boundary of an agricultural field that neither requires the farmer to connect dots nor requires the farmer to traverse the field boundary in a vehicle prior to farming. What is also needed is a system and method for deriving the field boundary of an agricultural field that gives the farmer flexibility in deriving the actual field boundary based on a set of points, that more accurately matches the field boundary to the true "shape" of the field, and that can accurately derive concave as well as convex, and other various unusual portions of the field boundary.

SUMMARY OF THE INVENTION

One or more of the foregoing limitations in the prior art have been overcome by the present invention which, according to one embodiment, is a method of analyzing a set of georeferenced data for deriving a field boundary of a field by receiving the georeferenced data for the field in a digital memory and generating an alpha shape of the georeferenced data, the alpha shape representing the field boundary of the field.

According to another embodiment of the present invention, an apparatus is provided for analyzing a set of georeferenced data to derive a field boundary of a field. The apparatus includes means for receiving the georeferenced data for the field in a digital memory and means for generating an alpha shape of the georeferenced data, the alpha shape representing the field boundary of the field.

According to yet another embodiment of the present invention, a computer program embodied on a computer-readable medium is provided for analyzing a set of georeferenced data to derive a field boundary of a field. The computer program includes means for receiving the georeferenced data for the field in a digital memory and means for generating an alpha shape of the georeferenced data, the alpha shape representing the field boundary of the field.

BRIEF DESCRIPTION OF THE DRAWINGS

The invention will become more fully understood from the following detailed description taken in conjunction with the accompanying drawings, wherein like reference numerals refer to like parts, and in which:

FIG. 3 represents a data structure in which a layer of data representing a spatially-variable characteristic of a field is stored in a digital memory;

FIG. 4 represents a set S of location points in the farming field;

DETAILED DESCRIPTION OF THE PREFERRED EMBODIMENTS

Figure 1:
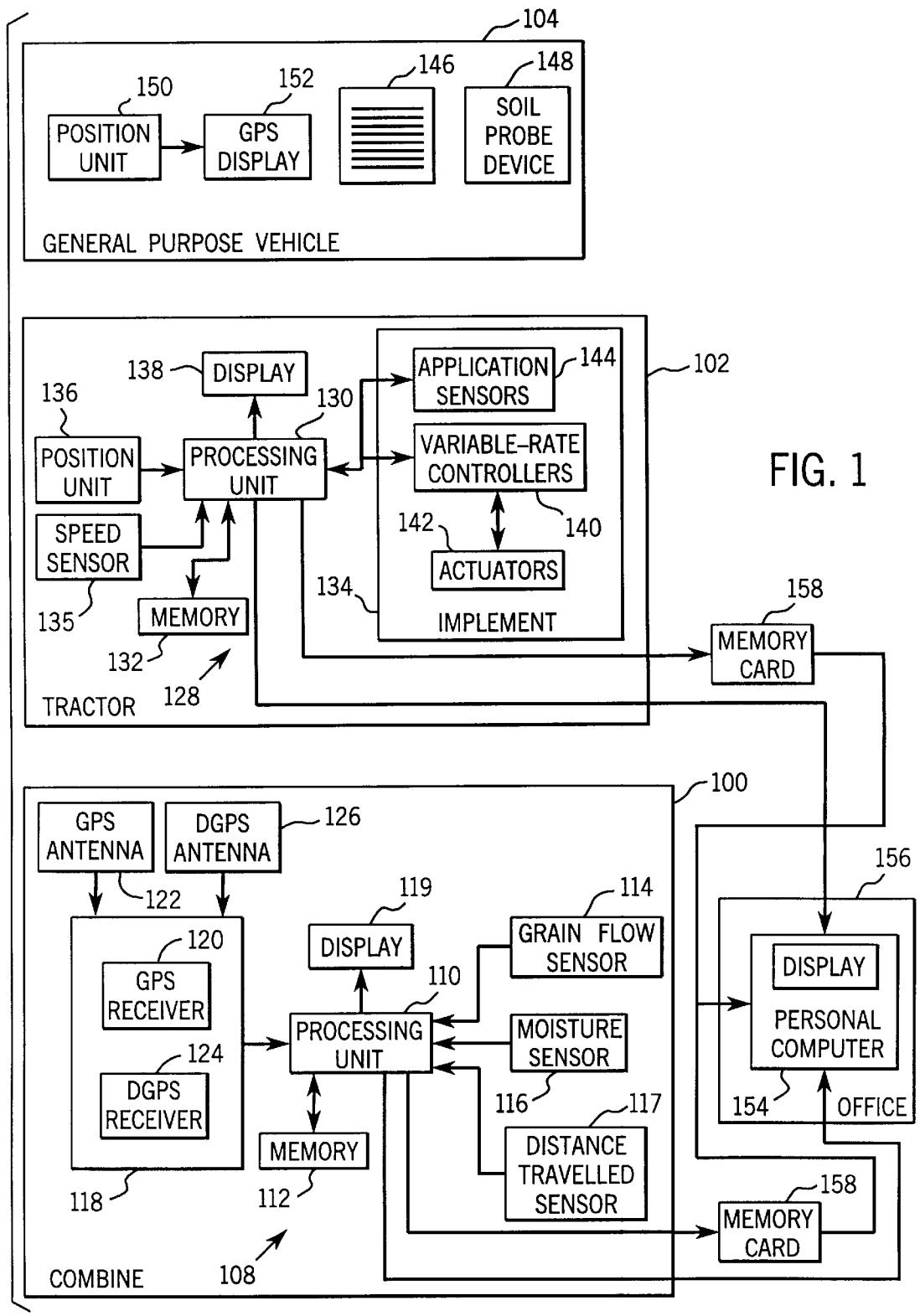
FIG. 1 is a block diagram representing an overview of equipment which can be used to gather and analyze georeferenced characteristic data representing different characteristics of a field.

Referring to FIG. 1, various types of equipment may be used to gather site-specific data representing various characteristics of an agricultural field. For example, a field may be sampled at different locations while the field is traversed by an appropriately-equipped agricultural vehicle such as a combine 100 or a planter, spreader or tractor 102, or by a general purpose vehicle such as a four-wheel drive truck 104. A farmer may also sample a field at different locations while traversing the field on foot. Each technique for gathering site-specific data includes circuitry or sensors which determine a characteristic of the field at different locations and a location determining circuit which generates location signals representative of the locations at which the samples were taken.

For example, a farmer may gather site-specific data (e.g., grain flow and grain moisture content data) while harvesting a field of corn using a harvesting vehicle, such as, combine 100. Combine 100 is equipped with a data collection system 108 which includes a processing unit 110, a memory 112 (e.g., RAM, hard or floppy disk, PCMCIA memory card, etc.), a grain flow sensor 114, a grain moisture content sensor 116, a distance traveled (speed) sensor 117, a position unit 118, and a display 119 (e.g., CRT, flat screen LCD display, etc.).

Processing unit 110 may be a yield monitor, such as an Ag Leader 2000 combine yield monitor made by Ag Leader Tech. of Iowa, or may be of a type which controls other functions of combine 100 (e.g., header position). Processing unit 110 receives signals representative of grain flow and moisture content from sensors 114 and 116, respectively, and digitizes the signals using a converter circuit such as an analog-to-digital (A/D) converter.

Flow sensor 114 may include a load sensor attached to a steel plate which is struck by grain passing through the clean-grain elevator of combine 100 to measure the force of the grain flow. Moisture sensor 116 may be positioned near the auger tube of combine 100 to measure the moisture content of grain passing over the sensor. Sensors 114, 116 generate signals representative of sensed field characteristics and transmit these signals to processing unit 110 which generates sensed characteristic data based on the signals. Distance traveled (speed) sensor 117 may include a magnetic pickup sensor configured to sense the speed of the wheels or transmission of combine 100, or may include a radar device mounted to the body of the combine. The distance traveled is equal to the product of the vehicle speed and elapsed time. The vehicle speed may also be sensed by calculating the difference between successive position signals received from position unit 118 and dividing by the elapsed time. Processing unit 110 also receives signals from position unit 118 which represent the positions of combine 100 when the grain flow, speed (distance traveled) and moisture content were sampled. Processing unit 110 correlates grain flow and moisture content data with position signals, and stores the data in memory 112. Yield (e.g., bu/acre) is determined by dividing the quantity of sensed grain (e.g., bu) by the area of the field harvested (e.g., acres), wherein the quantity of sensed grain is the product of the grain flow rate and time, and the area is the product of the width of cut and distance traveled. The stored data defines georeferenced digital maps wherein each data point is digitized and correlated with position data. Maps may be referred to as "layers" of data (e.g., yield layers). Maps and status information may be displayed on display 119.

Position unit 118 preferably includes a global positioning system (GPS) signal receiver 120 with an associated antenna 122, and a differential GPS (DGPS) signal receiver 124 with an associated antenna 126. A single integrated antenna may also be used in place of antennas 122 and 126. GPS receiver 120 may, for example, be made by Trimble Navigation Ltd. of California, and DGPS receiver 124 may be made by Satloc, Inc. of Arizona. GPS receiver 120 determines the longitude and latitude coordinates (and altitude) of combine 100 from signals transmitted by the GPS satellite network. Position unit 118 generates location data representative of a plurality of locations in the field. Alternatively, position unit 118 generates location signals and communicates the location signals to processing unit 110, and processing unit 110 generates the location data based on the communicated location signals. The accuracy of the position data is improved by applying location correction signals received by DGPS receiver 124. The location correction signals are correlated with the location signals by either position unit 118 or processing unit 110 to correct errors present on GPS signals including the selective availability error signal added to GPS signals by the U.S. government. DPGS correction signals are transmitted by the Coast Guard and by commercial services. The Omnistar DGPS system from John E. Chance & Assoc. of Texas, for example, includes a network of ten land-based differential reference stations which send correction signals to a master station which uploads signals to a satellite for broadcast throughout North America. A network of differential GPS towers has been built by Mobile Data Communications of Illinois. Correction signals may also be transmitted from a local base station such as the top of a farm building.

Site-specific data may also be gathered while traversing a field using tractor 102. Tractor 102 is equipped with a data collection system 128 including a processing unit 130, a memory 132, an implement system 134, a speed sensor 135 configured to sense the speed of tractor 102 (similar to sensor 117), a position unit 136 and a display 138. Processing unit 130 may include a processor configured to control the application of a spatially-variable farming input, such as seeds or fertilizer, to the field according to a prescription map or an operator's commands. Position unit 138 provides location information used as an index to the prescription map. Processing unit 130 may send commands to implement system 134 which includes one or more variable-rate controllers 140, actuators 142, and application sensors 144. Processing unit 130 may send a signal representing a commanded rate of application of the farming input. This commanded output rate is a function of the speed of tractor 102 and the desired application rate. For example, an increased speed will require an increased output rate to maintain a constant desired application rate. In response to the commands, variable-rate controllers 140 generate control signals applied to actuators 142 for controlling the application rate of farming inputs. Application sensors 144 provide feedback signals representing a sensed spatially-variable characteristic to processing unit 130 to enable closed-loop operation. Processing unit 130 generates spatially-variable application data based on the feedback signals. Examples of variable-rate application systems include a variable-rate planter controller from Rawson Control Systems of Iowa and a variable-rate fertilizer spreader from Soil Teq., Inc. of Minnesota.

A farmer may also gather site-specific farming data while traversing a field in general purpose vehicle 104 or on foot. For example, the farmer may see an area of insect infestation and note the location on a piece of paper 146, or may take soil probes 148 (noting locations) and send them to a laboratory for analysis. The location may be determined using a portable position unit 150 with a display 152, such as a hand-held GPS signal receiver unit. Locations may also be determined in other ways, such as triangulation from landmarks at known locations.

Still referring to FIG. 1, once georeferenced characteristic data representing spatially-variable characteristics of a farming field is obtained, the data is communicated to a computer system such as computer 154. Preferably, computer 154 is a personal computer or workstation located in the farm's office 156. However, computer 154 could be located in a vehicle such as combine 100 or tractor 102, and may be included in processing unit 110 or 130. Gathered data may be transferred to computer 154 in a number of ways. In one embodiment, data collection systems 108 or 128 include an interface for a removable memory card 158 which can be transported to office 156 and read by computer 154. Data collection systems 108, 128 and computer 154 each include a PCMCIA card reader, and memory card 158 is a PCMCIA card. Data may be stored directly on memory card 158 as data is collected, or may be transferred to memory card 158 from memories 112 or 132 after being gathered. Memories 112 and 132 may advantageously be used to back-up data, thereby safeguarding data in the event memory card 158 is damaged or lost. Memory card 158 may also be used to transfer prescription map data generated by computer 154 back to tractor 102. Other data communication interfaces may also be used to transfer data between vehicles 100, 102 and computer 154. For example, vehicles 100, 102 and computer 154 could be linked via a cable carrying RS-232 serial data, or by an RF or infrared data link.

Relatively small amounts of data may be transferred to computer 154 by manually entering data from paper 146 into computer 154. Data may be also be transferred from data collection system 108 or 128 via other storage media such as magnetic or optical disks or tapes. Image data, such as data represented within photographs, may be transferred into computer 154 using a digitizer or scanner (not shown) interfaced to computer 154. The digitizer creates a digital image which may be referred to as a bit map. Alternatively, a photograph could be placed on a digitizer and an input device could be used to trace a boundary around an area of interest. As the last example shows, the characteristic data may consist only of data representing the boundaries of a polygon.

Figure 2:
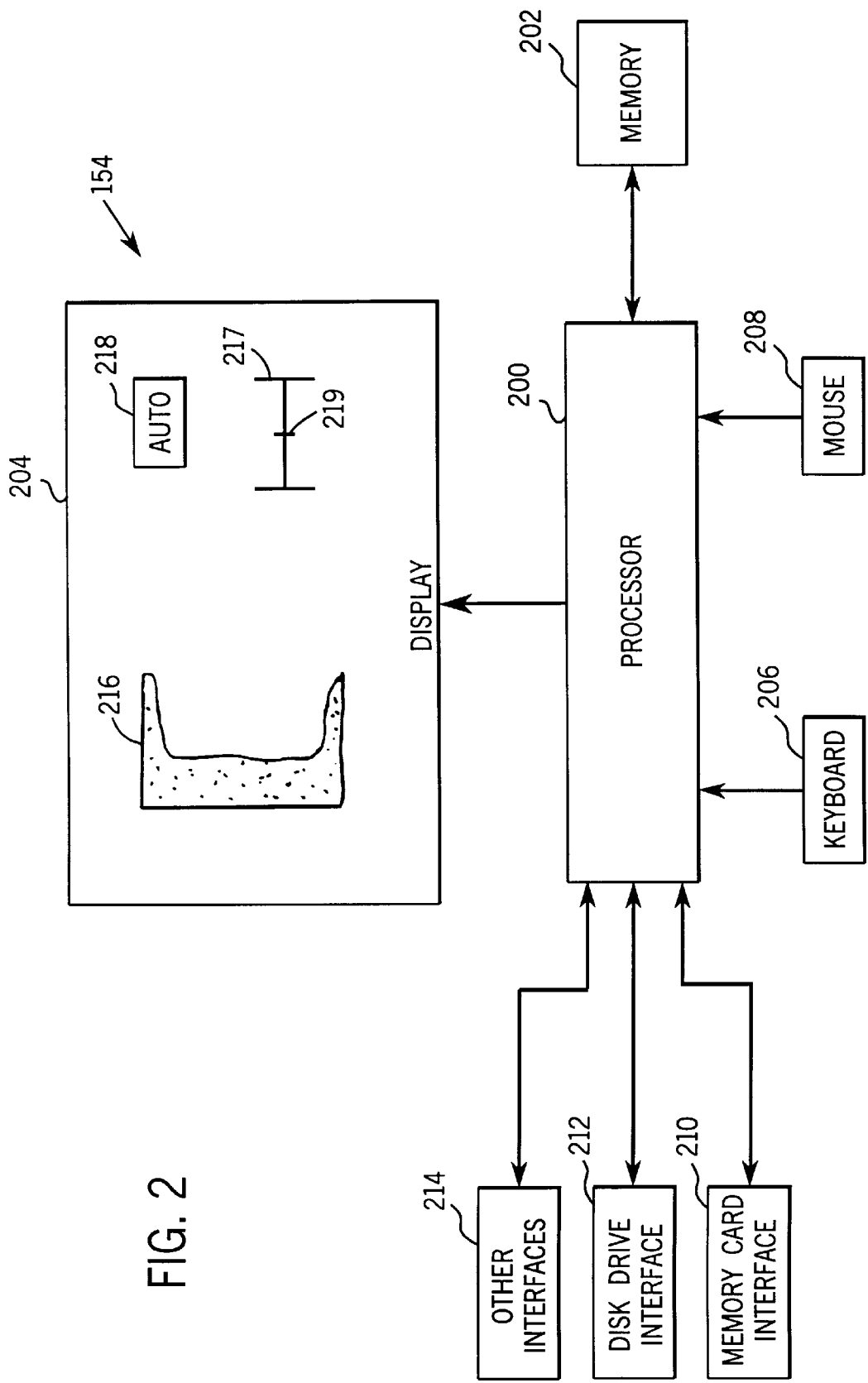
FIG. 2 is a block diagram of the office or portable computer shown in FIG. 1 which can be used to analyze site-specific characteristic data.

Referring to FIG. 2, computer 154 is preferably a programmed personal computer including a processor 200, a memory circuit 202, a color or monochrome electronic display 204, input devices such as a keyboard 206 or a mouse 208, and input/output interfaces such as a memory card interface 210, a hard or floppy disk drive interface 212, and other interfaces 214 (e.g., RF or infrared). An input device such as a joystick, light pen or touch screen may also be used. Alternatively, computer 154 may be implemented using dedicated, specific-purpose equipment or hard-wired logic circuitry. Processor 200 may be an x86 or Pentium® microprocessor configured to execute a program stored in memory 202 (e.g., a digital memory) or on a disk read by disk drive interface 212. Preferably, processor 200 reads spatially-variable characteristic data including position information from memory card 158 using memory card interface 210. Data may also be entered using keyboard 206, mouse 208, disk drive interface 212, or another interface 214.

Processor 200 generates display signals which, when applied to display 204, cause alpha-numeric and graphical visual indicia to be displayed. For example, the display signals may cause display 204 to create a visual map 216 of a set of data points for a field. Display 204 may further include operator-adjustable input devices 217 and 218 to receive operator input, generate input signals, and transmit the input signals to processor 200. Preferably, display 204 is a color monitor, but it may also be a monochrome monitor capable of displaying different light intensity levels. Input device 218 is an Automatic/Manual switch for selecting whether an alpha value, described below, will be automatically determined by processor 200, or will be manually determined by the operator using input device 217, which includes a swingbar 219. In one embodiment, input device 218 is toggled between its Automatic and Manual states by pointing and clicking mouse 208 on an area of display 204 defined for device 218, and input device 217 is operated by dragging swingbar 219 with mouse 208. Of course, other types of input devices (e.g., switches, defined keys, etc.) could be used. The use of input devices 217 and 218 is described below.

FIG. 3 generally represents the structure in which a layer of georeferenced data representing a characteristic of a farming field is stored in memory. The structure may be referred to as a georeferenced digital map, or a layer of data. The structure is preferably implemented using a database 300 (e.g., a geographical information system (GIS) database) represented by the table shown in FIG. 3, wherein each row represents a characteristic data point taken at a location in the field. For example, a layer having 5000 data points is represented by a table having 5000 rows. Columns of information are associated with each data point. For example, the columns shown in FIG. 3 include yield data (bu/acre), moisture content, and the longitude and latitude coordinates at which the georeferenced data points were sampled. Additional columns (not shown) may include flow rate, GPS time, combine serial number (S/N), field identification, type of grain (e.g., corn), and altitude. The data structure of FIG. 3 represents, for example, a yield layer. Data in the first row (Data Point No. 1) indicates that flow sensor 114 and moisture sensor 116 of combine 100 sensed grain flow corresponding to a yield of 32.0739 bu/acre and a moisture content of 17.7, respectively, at a location defined by longitude and latitude coordinates −88.7291520 and 39.0710720. Similar structures may be used to store other layers of data. For example, a pH layer may include a row for each data point and columns for pH, longitude and latitude.

Georeferenced digital maps, such as shown in FIG. 3, may be provided to computer 154 on memory card 158, or on another storage medium used to transfer data to computer 154. The maps may include data representative of yield, moisture content, or any other characteristic of a field. Data may also be provided to computer 154 using other data structures, or may be provided by manually entering characteristic data with its position information, and processor 200 may restructure the data to provide a data structure similar to that shown in FIG. 3. Other digital map structures may be used which correlate spatially-variable characteristic data with the position in the field where the data was taken.

In general, once georeferenced digital maps of a field have been provided as described above, processor 200 executes a field mapping program which reads data from the maps and causes visual maps of the field to be displayed on electronic display 204. The visual maps may include representations of the characteristic data. For example, if the georeferenced digital map represents a yield layer, the column of yield data may be represented on display 204 at locations determined by the associated longitude and latitude data, thereby forming a yield map.

Characteristic data may be visually represented in several ways. In a preferred embodiment, distinguishable colors represent different ranges of data. For example, the colors red, orange, yellow, green, cyan, blue and violet may represent increasing ranges of average yield. Each range may be based on an average yield for the field selected by the user with green centered at the average yield. For example, each color may represent a range of 5 bu/acre if the user selects an average yield of 50 bu/acre or less, a range of 10 bu/acre if the selected average yield is 50 to 125 bu/acre, or a range of 15 bu/acre if the selected average yield is 125 bu/acre or more. Alternatively, different ranges may be represented by alpha-numeric characters or different light intensity levels. Processor 200 uses the longitude and latitude coordinates associated with each data point and scales them to determine the location in the visual map where the characteristic is displayed.

Once georeferenced data, such as that shown in FIG. 3, is collected, analysis of the data is possible. As stated hereinbefore, an immediately derivable set of information regarding the georeferenced data is the field boundary. FIG. 4 represents a set of georeferenced data 400 including a plurality of georeferenced data points 402. Manually connecting the dots around the perimeter of set 400 is not only a time-consuming and inaccurate solution to finding the field boundary, but it also presents problems in deciding the true "shape" of set 400. For example, it is unclear whether the field boundary should extend from data point 404 to data point 406 and then to data point 408, or whether the field boundary should extend directly from data point 404 to 408.

Figure 5:
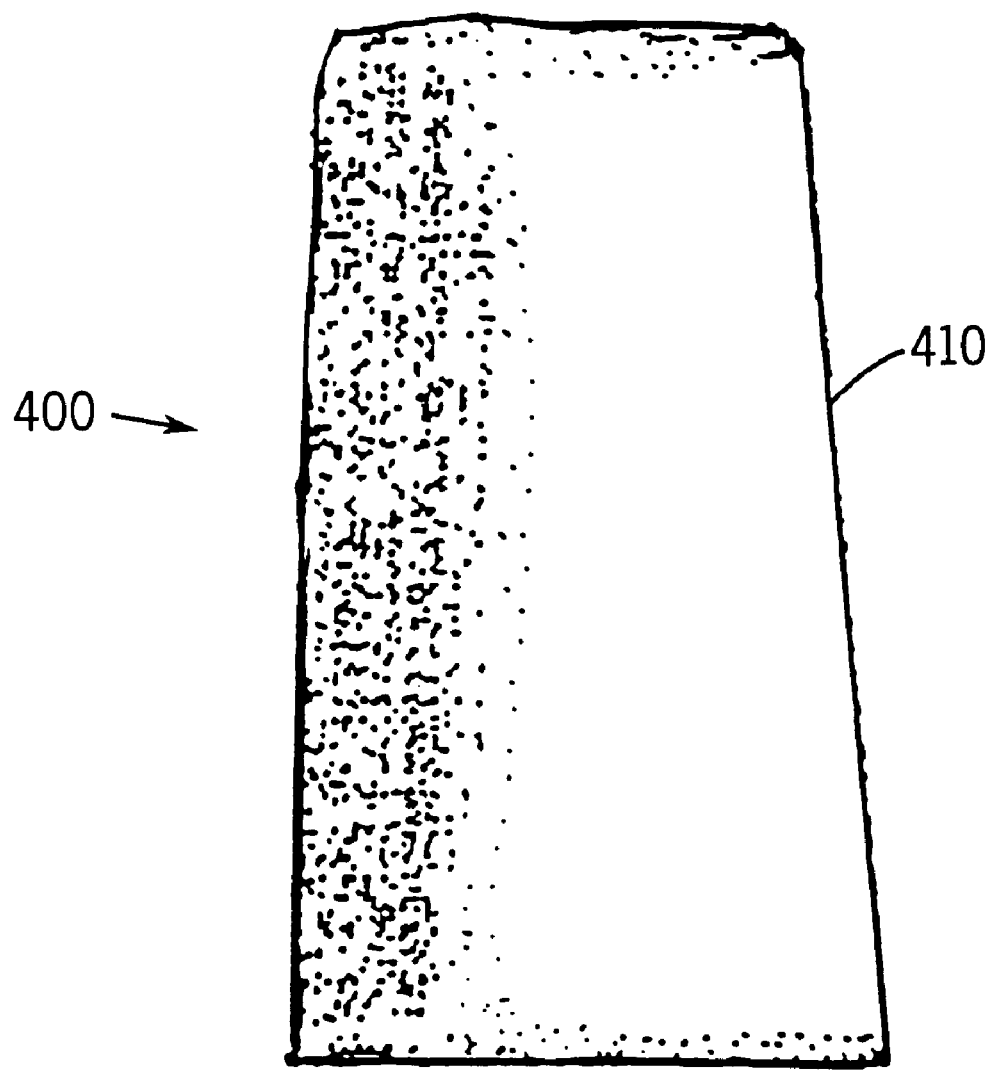
FIG. 5 represents a field boundary of the farming field generated according to the convex hull of sets.

One solution for deriving the field boundary based upon set 400 is to use Delaunay triangulation to derive the two-dimensional convex hull 410 of set 400, as shown in FIG. 5. See, e.g., Cressie, N. A. C., "Statistics for Spatial Data", pp. 373–374, 1991. The two-dimensional convex hull is the smallest convex polygon containing all georeferenced data points 402 in set 400. See also Sedgewock, R., "Algorithms in C++", pp. 359–4112, 1992. The convex hull can roughly be analogized to placing a rubber band around set 400. While the convex hull provides a close approximation of a convex field boundary, any concave portions of the field are not accurately represented in the shape, as shown in FIG. 5. Fields often have "L" or "C" shapes, or other concave shapes which are not suitably addressed by the convex hull solution.

Figure 6:
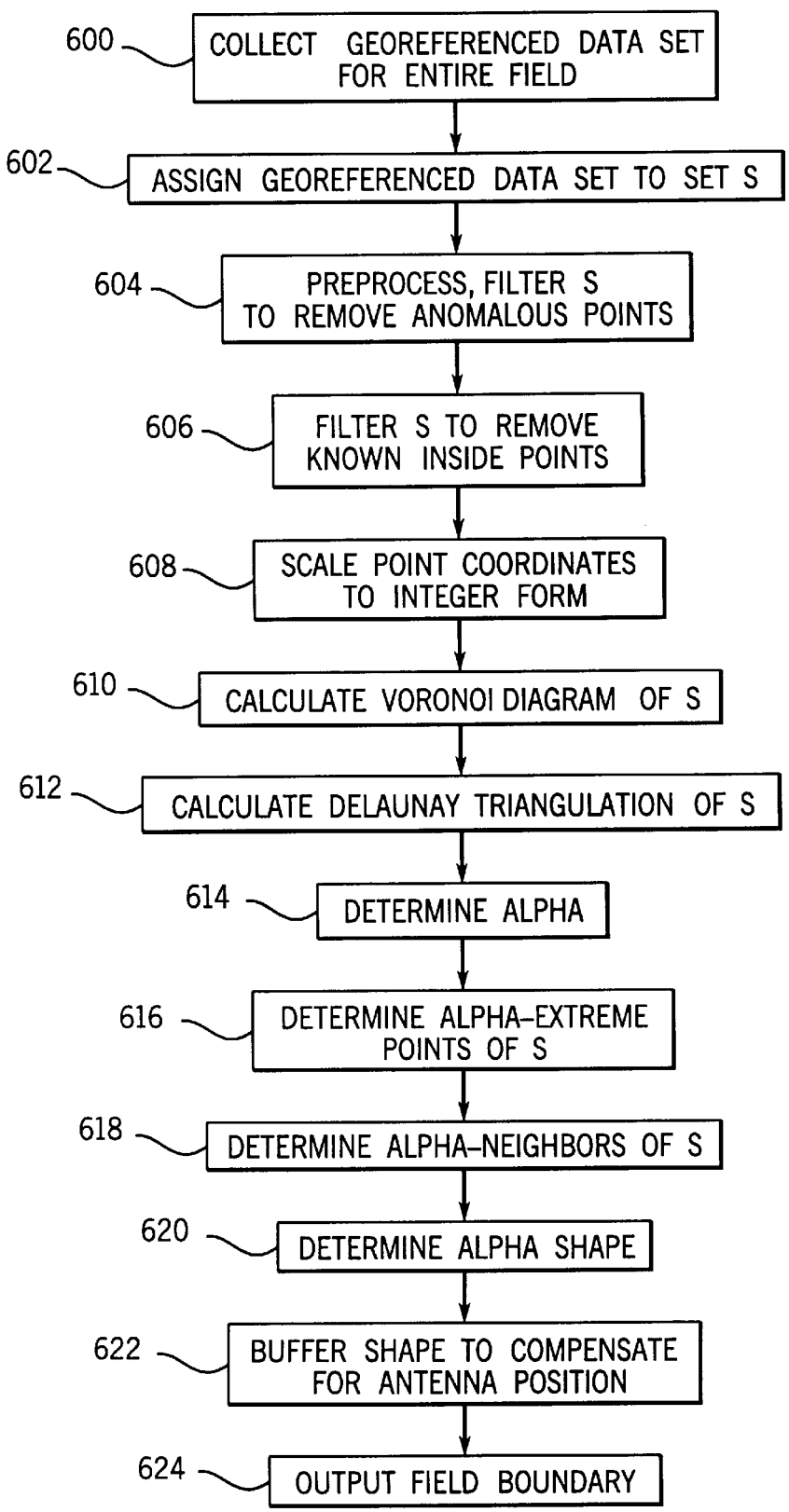
FIG. 6 is a flowchart showing steps in a method according to one embodiment of the present invention for deriving the field boundary of a field.

A solution suitable for both convex and concave portions of a field is presented in accordance with one embodiment of the present invention in FIG. 6. The computational steps performed in FIG. 6 are coded in software, resident on a memory device (e.g., a floppy disk, a hard drive, a read-only memory (ROM), a compact-disk ROM (CD-ROM), a PCMCIA card) and operable on a general purpose computing system such as processing units 110, 130 or personal computer 154.

At step 600, georeferenced data is collected for the entire field. The georeferenced data may be collected using any of a plurality of techniques, some of which are described hereinabove with reference to FIGS. 1, 2 and 3. The result is a set of georeferenced data as shown in FIG. 4. At step 602, the set of georeferenced data is assigned to a set S, such as set 400, for further analysis.

At step 604, set S is filtered to remove anomalous data points. Known anomalous data points include data points generated during a loss of location signals or correction signals by position unit 118, 136. Loss of location signals or correction signals may result in data points located a significant distance from the rest of set S (e.g., data points miles away, underground, above ground, etc.). Anomalous data points also include data points resulting from errors due to interference, multipath, etc., in transmission of signals from the GPS satellite network to GPS receiver 120, in transmission of signals from the DGPS correction signal network to DGPS receiver 124, and in transmission of signals from position unit 118, 136 to processing unit 110, 130. Anomalous data points are filtered at step 604 using filtration algorithms such as those described in U.S. Pat. Appl. Ser. No. 08/753,335, filed on Nov. 22, 1996, U.S. Pat. No. 5,878,371, and assigned to the assignee of the present application, incorporated herein by reference. Alternatively, some or all of the anomalous data points may be replaced by data points synthesized based upon known relationships in the farming data, as also described in U.S. Pat. Appl. Ser. No. 08/753,335.

At step 606, set S may be filtered to remove data points known to be inside or internal to the field boundary. Step 606 is particularly important for large data sets including, for example, 50,000 or more data points. Subsequent processing steps, especially Delaunay triangulation step 612, can be significantly delayed by the presence of unneeded points which are known to be inside the field boundary. This additional delay can be 10–15 seconds or more, which may be unacceptable for certain applications.

At step 608, the latitude and longitude, or other position coordinates, of each data point in set S are converted to integer format. Position units 118, 136 typically output the position coordinates of each data point in floating point or some other decimal-based format as shown in FIG. 3. However, subsequent processing steps in FIG. 6 utilize an integer-based coordinate set. Accordingly, the decimal-based coordinates output by position units 118, 136 are converted to integer-based coordinates.

Referring now to steps 610–620, an alpha shape for set S is derived according to one embodiment of the present invention. An alpha shape, a polytope or polyhedron, expresses the notion of "shape" for a point set. The alpha shape is a generalization of the convex hull and can provide a closer approximation to the true "shape" of the point set than the convex hull, particularly for concave portions of the shape. In this embodiment, constructing the alpha shape involves three constructs in computational geometry: the Voronoi diagram of set S, the Delaunay triangulation of set S and, finally, the alpha shape of set S. A detailed disclosure of these concepts, along with their proofs and relationships, can be found in the following three references: 1) Edelsbrunner, H. and Müicke, E. P., "Three-dimensional Alpha Shapes", ACM Transactions on Graphics, 13(1) :43–72 (1994), 2) Edelsbrunner, H., "Weighted Alpha Shapes", Tech. Report UIUCDCS-R-92-1760, Dept. of Computer Science, University of Illinois at Urbana-Champaign, Urbana, Ill. (1992) and 3) Edelsbrunner, H., et al., "On the Shape of a Set of Points in the Plane", IEEE Transactions on Information Theory IT-29:551–559 (July, 1993). Each of these references is incorporated by reference herein.

A brief description of these constructs as they relate to the present invention is provided below. Software for computing these constructs may be, for example, "HULL", by Ken Clarkson of AT&T, though other software may be used as well. Most software available for computation of these constructs performs the computation in three or more dimensions. The embodiment of steps 610–620 preferably utilizes software operating in only two dimensions to simplify the computations and reduce analysis time.

At step 610, the Voronoi diagram of set S is calculated or derived. The closest point Voronoi diagram of set S, VDc(S), is a covering of the entire two-dimensional plane by n regions, e.g., Vp, each region having a single data point p∈S, where:

$$Vp=\{x|d(p,x) \geq d(q,x), p \neq q \in S\}$$

Figure 9A:
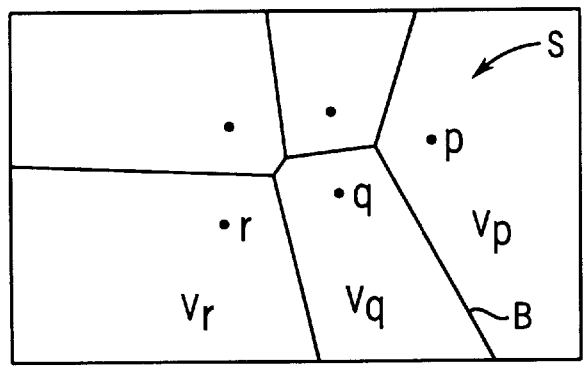
FIGS. 9A–9C are illustrations showing a Voronoi diagram, Delaunay triangulation and alpha extreme points for a sample set of points.

If Vp and any second region Vq containing a data point q share a common point, points p and q of S are said to be closest point Voronoi neighbors. For example, in FIG. 9A, a Voronoi diagram of a set of points S is shown. Data points p and q are closest point Voronoi neighbors because their respective regions, Vp and Vq share at least one common point along border B. However, data points p and r are not closest point Voronoi neighbors because their respective regions, Vp and Vr do not share at least one common point.

Figure 9B:
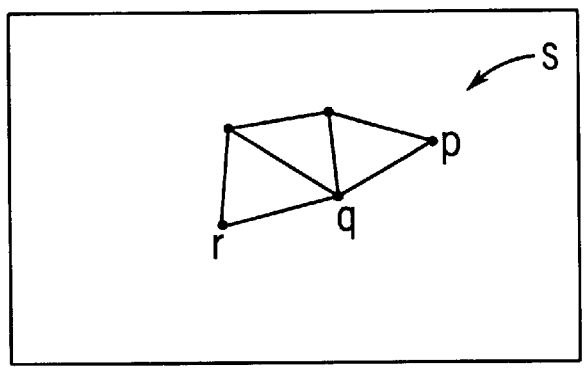

At step 612, the Delaunay triangulation of set S is calculated or derived based on the Voronoi diagram. The closest point Delaunay triangulation of a set of points S, DTc(S), is defined by connecting a straight line between p and q if and only if p and q are closest point Voronoi neighbors. Referring to FIG. 9B, the closet point Delaunay triangulation of set S is shown. Note that a straight line is drawn between p and q because they are closest point Voronoi neighbors, but not between p and r because they are not closest point Voronoi neighbors.

At step 614, alpha is determined. The parameter alpha controls the level of detail reflected by the shape around set S as described below with reference to step 616. This parameter can be entered via suitable operator input device or can be calculated based on the ideal value of alpha, as described below with reference to FIG. 2.

Figure 9C:
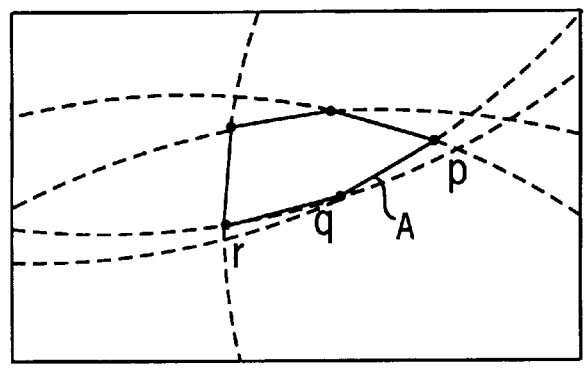

At step 616, alpha extreme points of set S are determined. A point p in set S is alpha extreme in S if there exists a closed generalized disc or circle of radius 1/alpha such that p lies on its boundary and it contains all the points of set S. Stated another way, from a given point p, extend a line segment of length 1/alpha in opposite directions and then draw a circle around the two end points; if the circle contains all points in S, then the point is called alpha extreme. This is repeated for all points in set S. Referring to FIG. 9C, each of the data points in set S is alpha extreme for the given value of alpha because for each data point a closed generalized disc (i.e., an alpha disk) of radius 1/alpha exists such that the data point lies on its boundary and it contains all the points on S. Naturally, changing the value of alpha will change the set of points that are alpha extreme.

At step 618, alpha neighbors of set S are determined. If for two alpha extreme points p and q there exists a closed generalized disc of radius 1/alpha with both points on its boundary and the disc contains all other points, then p and q are said to be alpha neighbors. Referring again to FIG. 9C, points p and q are alpha neighbors, but points p and r are not. Stated in another way, if p and q are alpha neighbors, they are adjacent in DTc(S). Therefore, given a set of edges comprising DTc(S), possible alpha neighbors are determined by examining adjacency of points. Again, varying the value of alpha will change the set of points that are alpha neighbors.

At step 620, the alpha shape of set S is derived for the value of alpha determined in step 614. Given an arbitrary, real alpha, the alpha shape of S is the straight line graph whose vertices are alpha extreme points and whose edges connect respective alpha neighbors. Given the list of alpha extreme points and edges of possible alpha neighbors, building the alpha shape then consists of keeping the edges whose endpoints are both alpha extreme points. Thus, the alpha shape of set S in FIG. 9C is indicated by the solid line A. When alpha is large (the extreme being the radius of the largest enclosing circle of a point set), the alpha shape is rather crude. As alpha decreases, the alpha shape shrinks and eventually develops cavities or voids in the triangulation, as shown below with reference to FIG. 7A. When alpha becomes zero, no triangles are filled. In this case, all points are isolated, extreme points of the shape.

Figure 7A:
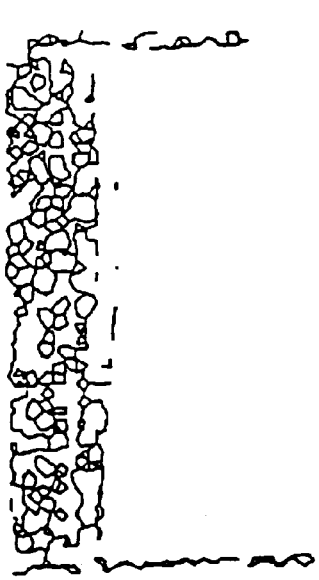
FIGS. 7A–7D represent alpha shapes generated for set S based on varying values of alpha.
Figure 7B:
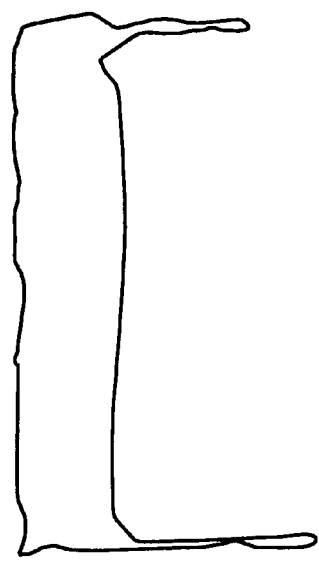
Figure 7C:
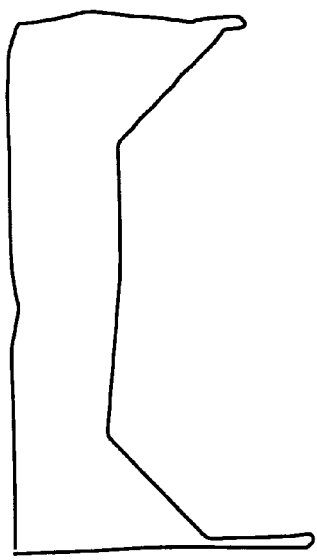
Figure 7D:
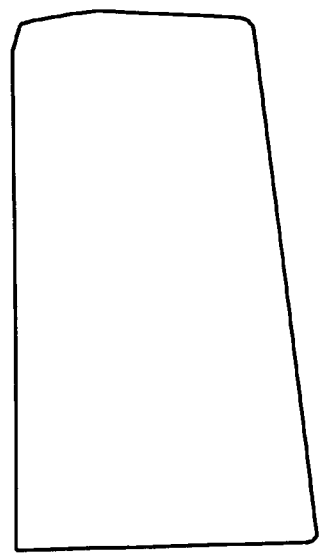

Referring now to FIGS. 7A–D, the effect of a change in alpha on the alpha shape is illustrated. FIG. 7A shows the alpha shape of the set of data points S first introduced in FIG. 4 for an alpha value of 917.5 using the HULL software. It can be seen that this value of alpha has resulted in an alpha shape including cavities, islands and other anomalies. FIG. 7B shows the alpha shape of set S for an alpha value of 3646.9. This value of alpha gives a very close approximation of the true "shape" of set S. FIG. 7C shows the alpha shape of set S for an alpha value of 15470 and FIG. 7D shows the alpha shape of set S for an alpha value of approximately infinity which will be recognized as the convex hull.

Referring again to FIG. 6, at step 622 the alpha shape is buffered to compensate for antenna position on the vehicle. Buffering refers to the operation in geographic information systems where a new polygon is created by adding a predetermined distance or offset, δ, to a point, line or area. Every point on the new polygon is at least δ distance from any point of the original spatial entity. Thus, buffering a point creates a circumcircle and buffering a rectangle produces a larger rectangle, both sharing the same center. In the present invention, if GPS antenna 122 is located in the center of the top of the cab of combine 100, the alpha shape is buffered by δ equal to one-half the width of the header of combine 100. This buffering causes the alpha shape to more accurately coincide with the true field boundary. The value δ will thus depend on the geometrical relationship between antenna 122 and the width of the vehicle's implement.

Figure 8:
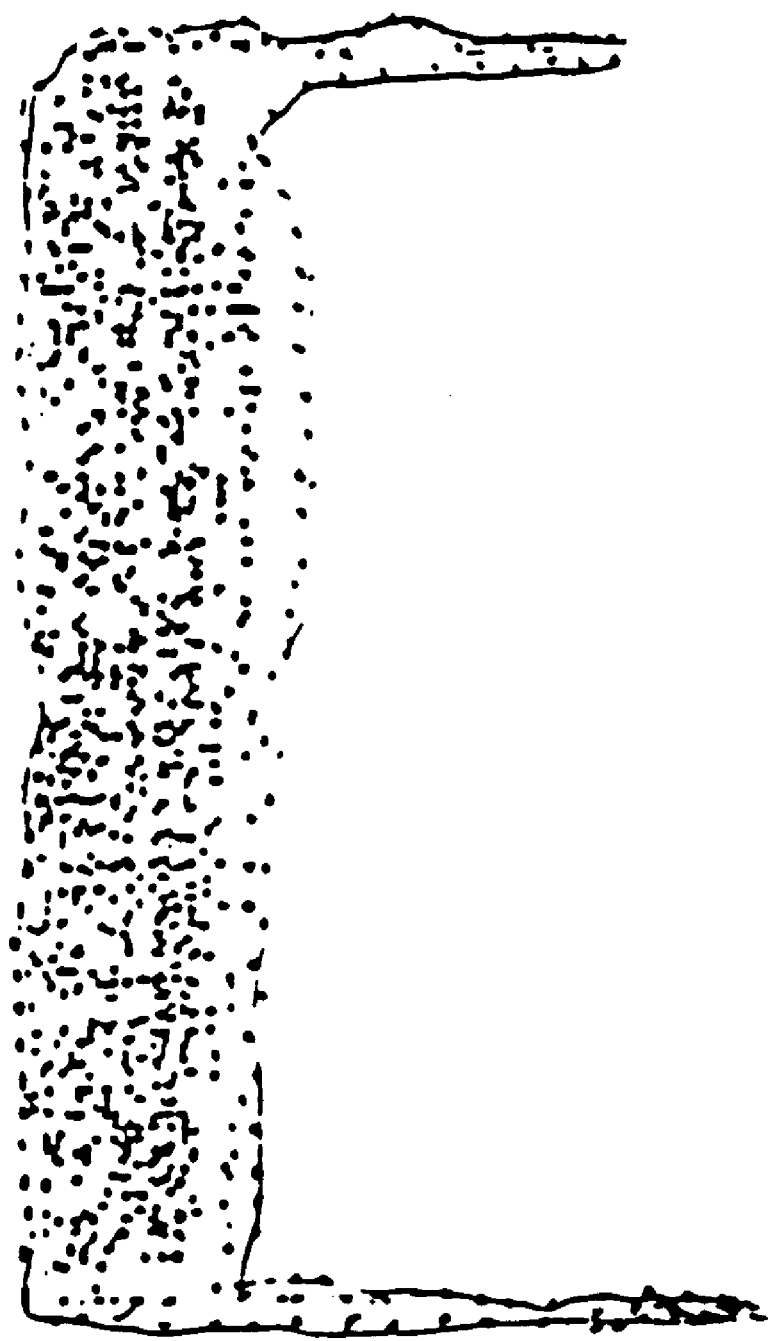
FIG. 8 represents the set S of location points of FIG. 4 including a field boundary of the field based on the optimal alpha shape of FIG. 7B.

At step 624, the field boundary is output to a suitable output circuit. The output circuit may be a memory circuit or an electronic display such as display 204. The field boundary derived from the alpha shape with a suitable value of alpha, along with the associated point set S, is shown in FIG. 8.

Referring again to FIG. 2, an operator interface according to one embodiment of the present invention is shown. After traversing a field and gathering georeferenced data, the operator analyzes the georeferenced data using either systems 108, 128 or computer 154. Display 204 shows visual map 216 including graphical indicia of the field boundary derived from the alpha shape along with the associated point set S, as shown in FIG. 8. Derivation of the alpha shape may be a step performed after other data analysis or may be a preliminary step performed during importation of the data from memory card 158 to office computer 154. When the alpha shape derivation has begun, the operator may be prompted by one or more messages shown on display 154 to select from among several options. For example, the operator may select whether a buffering step should be performed or not. The operator may also advantageously adjust the filtering in steps 604 and 606, add or delete individual data points in set S, decide from which memory circuit the data points will be analyzed or select one set of georeferenced data from a plurality of sets of georeferenced data. Based on these user inputs, computer 154 generates visual map 216 according to the method of FIG. 6.

The operator may also select via input device 218 whether the value of alpha should be computed automatically "AUTO" or entered manually "MANUAL". If AUTO is selected, the value of alpha is computed to be the smallest value of alpha such that the alpha shape is substantially free of cavities, voids or islands (i.e., such that the alpha shape contains all points in the set). One approach computationally would be to count the number of polygons in the alpha shape for varying values of alpha and look for the point at which the value of alpha transitions from multiple to polygons to a single polygon. One suitable routine is found in the HULL software referenced hereinabove. If MANUAL is selected, the operator may input the value of alpha via input device 217 by dragging swingbar 219 via a cursor (not shown) controllable by mouse 208 from a low value of alpha to a high value of alpha. Advantageously, the field boundary displayed along with the set of points changes in real time as the value of alpha is adjusted. The operator stops adjusting the alpha value when the boundary accurately depicts the field. Operator input for the above options and other options may alternatively be received via keyboard 206 or other interfaces 214 such as a voice-activated input device.

It is understood that, while the detailed drawings and specific examples given describe exemplary embodiments of the present invention, they serve the purpose of illustration only. The present invention is not limited to the precise details, methods, materials and conditions disclosed. For example, while the present invention has been disclosed with reference to an agricultural field and agricultural vehicles, it may also be applied to a construction site and construction vehicles wherein the sensed field characteristic is a construction site characteristic, such as, field grade. Additionally, while the present application has presented a two-dimensional alpha shape derivation to simplify the calculations, three-dimensional alpha shape derivations are also contemplated in the present invention. Accordingly, the present invention is not be limited to any specific embodiment herein, but rather is to extend to all embodiments now known or later developed that fall within the spirit and scope of the present invention as defined by the claims appended hereto.

What is claimed is:

1. A method of analyzing a set of georeferenced data for deriving a field boundary of a field, comprising the steps of:
   receiving the georeferenced data for the field in a digital memory; and
   generating an alpha shape of the georeferenced data, wherein the alpha shape represents the field boundary of the field.

2. The method of claim 1, wherein the step of receiving includes receiving georeferenced data including characteristic data representative of a spatially-variable characteristic of the field.

3. The method of claim 1, further comprising generating display signals representative of the alpha shape which, when applied to an electronic display, generate a visual indicia of the field boundary.

4. The method of claim 1, wherein the step of generating includes determining alpha.

5. The method of claim 4, wherein the step of determining alpha includes receiving the value of alpha from an operator-adjustable input device.

6. The method of claim 4, wherein the step of determining alpha includes automatically determining the smallest value of alpha that generates an alpha shape substantially free of cavities.

7. The method of claim 1, wherein the step of generating an alpha shape further comprises the steps of:
   performing a Delaunay triangulation of the georeferenced data;
   determining alpha;
   determining alpha extreme points of the georeferenced data based on alpha;
   determining alpha neighbors of the georeferenced data based on alpha; and
   generating the alpha shape based on the alpha extreme points and alpha neighbors.

8. The method of claim 1 wherein the step of generating an alpha shape includes buffering the alpha shape by a predetermined distance representative of an offset between a positioning antenna and the field boundary.

9. The method of claim 1 wherein the step of generating an alpha shape includes filtering the georeferenced data to remove anomalous data points from the georeferenced data.

10. The method of claim 1 wherein the step of generating an alpha shape includes filtering the georeferenced data to remove at least a portion of the data points known to be interior to the field boundary.

11. The method of claim 1 wherein the step of generating an alpha shape includes scaling the georeferenced data from a decimal format to an integer format.

12. The method of claim 1, further comprising the steps of:
   sensing a spatially-variable characteristic of the field; and
   generating sensed characteristic data representative of the sensed spatially-variable characteristic, wherein the step of receiving includes receiving georeferenced data including the sensed characteristic data.

13. The method of claim 12, further comprising traversing the field in a harvesting vehicle, wherein the field is an agricultural field and the spatially-variable characteristic depends upon sensed grain flow.

14. The method of claim 12, further comprising traversing the field in a construction vehicle, wherein the field is a construction site and the spatially-variable characteristic is field grade.

15. The method of claim 1, further comprising the steps of:
   sensing a spatially-variable input applied to the field; and
   generating application data representative of the sensed spatially-variable input, wherein the step of receiving includes receiving georeferenced data including the application data.

16. The method of claim 1, further comprising the step of:
   generating location data representative of a plurality of locations within the field, wherein the step of receiving includes receiving georeferenced data including the location data.

17. The method of claim 16, wherein the step of generating location data includes receiving location signals, receiving location correction signals, correlating the location signals with the location correction signals, and generating the location data based on the correlated location signals.

18. The method of claim 1, wherein the georeferenced data include longitude and latitude coordinates associated with each georeferenced data point.

19. An apparatus for analyzing a set of georeferenced data for deriving a field boundary of a field, comprising:

means for receiving the georeferenced data for the field in a digital memory; and means for generating an alpha shape of the georeferenced data, wherein the alpha shape represents the field boundary of the field.

20. The apparatus of claim 19, wherein the means for receiving includes means for receiving georeferenced data including characteristic data representative of a spatially-variable characteristic of the field.

21. The apparatus of claim 19, further comprising means for generating display signals representative of the alpha shape which, when applied to an electronic display, generate a visual indicia of the field boundary.

22. The apparatus of claim 19, wherein the means for generating includes means for determining alpha.

23. The apparatus of claim 19 wherein the means for generating an alpha shape further comprises:

means for triangulating the georeferenced data;

means for determining alpha;

means for determining alpha extreme points of the georeferenced data based on alpha;

means for determining alpha neighbors of the georeferenced data based on alpha; and means for generating the alpha shape based on the alpha extreme points and alpha neighbors.

24. The apparatus of claim 19 wherein the means for generating an alpha shape includes means for buffering the alpha shape by a predetermined distance representative of an offset between a positioning antenna and the field boundary.

25. The apparatus of claim 19 wherein the means for generating an alpha shape includes means for filtering the georeferenced data to remove anomalous data points from the georeferenced data.

26. The apparatus of claim 19 wherein the means for generating an alpha shape includes means for filtering the georeferenced data to remove at least a portion of the data points known to be interior to the field boundary.

27. The apparatus of claim 19 wherein the means for generating an alpha shape includes means for scaling the georeferenced data from a decimal format to an integer format.

28. The apparatus of claim 19, further comprising:

means for sensing a spatially-variable characteristic of the field; and means for generating sensed characteristic data representative of the sensed spatially-variable characteristic, wherein the means for receiving includes means for receiving georeferenced data including the sensed characteristic data.

29. The apparatus of claim 28, further comprising means for traversing the field, wherein the field is an agricultural field and the spatially-variable characteristic is grain flow.

30. The apparatus of claim 28, further comprising means for traversing the field, wherein the field is a construction site and the spatially-variable characteristic is field grade.

31. The apparatus of claim 19, further comprising:

means for sensing a spatially-variable input applied to the field; and means for generating application data representative of the sensed spatially-variable input, wherein the step of receiving includes receiving georeferenced data including the application data.

32. The apparatus of claim 19, further comprising means for generating location data representative of a plurality of locations within the field, wherein the means for receiving includes means for receiving georeferenced data including the location data.

33. The apparatus of claim 32, wherein the means for generating location data includes means for receiving location signals, means for receiving location correction signals, means for correlating the location signals with the location correction signals, and means for generating the location data based on the correlated location signals.

34. The apparatus of claim 19, wherein the georeferenced data include longitude and latitude coordinates associated with each georeferenced data point.

35. A computer program embodied on a computer-readable medium for analyzing a set of georeferenced data to derive a field boundary of a field, comprising:

means for receiving the georeferenced data for the field in a digital memory; and means for generating an alpha shape of the georeferenced data, the alpha shape representing the field boundary of the field.

36. The computer program of claim 35, wherein the georeferenced data includes characteristic data representative of a spatially-variable characteristic of the field.

37. The computer program of claim 36, the means for generating further comprising:

means for determining alpha; and means for filtering the georeferenced data to remove anomalous data points from the georeferenced data.

38. The computer program of claim 36, wherein the field is an agricultural field and the spatially-variable characteristic is crop yield.

\* \* \* \* \*